United States Patent
Mostoller et al.

(10) Patent No.: US 10,670,245 B2
(45) Date of Patent: Jun. 2, 2020

(54) ENVIRONMENTAL SENSOR FOR A LIGHT SENSOR ASSEMBLY HAVING A LID ASSEMBLY COMPRISING AN AIRFLOW COMPONENT AND AN ENVIRONMENTAL SENSING COMPONENT

(71) Applicant: TE CONNECTIVITY CORPORATION, Berwyn, PA (US)

(72) Inventors: Matthew Edward Mostoller, Hummelstown, PA (US); Justin Latorre, Harrisburg, PA (US); Christopher George Daily, Harrisburg, PA (US); Charles Raymond Gingrich, III, Mechanicsburg, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 353 days.

(21) Appl. No.: 15/844,865

(22) Filed: Dec. 18, 2017

(65) Prior Publication Data
US 2019/0186719 A1    Jun. 20, 2019

(51) Int. Cl.
| | |
|---|---|
| *G01J 1/42* | (2006.01) |
| *F21V 21/15* | (2006.01) |
| *G01L 19/14* | (2006.01) |
| *F21V 23/04* | (2006.01) |

(Continued)

(52) U.S. Cl.
CPC .......... *F21V 21/15* (2013.01); *F21V 23/0442* (2013.01); *F21V 23/0464* (2013.01); *G01J 1/0271* (2013.01); *G01J 1/42* (2013.01); *G01J 1/4204* (2013.01); *G01L 19/147* (2013.01); *H05B 47/105* (2020.01)

(58) Field of Classification Search
CPC .............. F21V 23/0442; F21V 23/0464; G01J 1/0271; G01J 1/4204

USPC .......................................... 250/214 AL, 239
See application file for complete search history.

(56) References Cited

U.S. PATENT DOCUMENTS

| | | | | |
|---|---|---|---|---|
| 2013/0044444 | A1* | 2/2013 | Creighton | ............. G01J 1/0271 361/752 |
| 2015/0124100 | A1 | 5/2015 | McRory | |

FOREIGN PATENT DOCUMENTS

| | | |
|---|---|---|
| WO | 2012/074641 A1 | 6/2012 |
| WO | 2013/026008 A2 | 2/2013 |

OTHER PUBLICATIONS

International Search Report, International Application No. PCT/IB2018/059615, International Filing Date, Dec. 4, 2018.

* cited by examiner

*Primary Examiner* — Que Tan Le

(57) ABSTRACT

A light sensor assembly includes a sensor connector configured to be coupled to a receptacle connector mounted to a light fixture. The sensor connector includes a housing having a top and a bottom defining a mating interface configured to be mated to the receptacle connector. The housing has a sealed cavity including a first sensor component in the sealed cavity sensing an environmental characteristic exterior of the sensor connector. The sensor connector includes power contacts held by the housing and extending from the bottom for electrical connection with receptacle power contacts of the receptacle connector. The sensor connector includes a lid assembly at the top of the housing. The lid assembly has a lid defining an unsealed cavity allowing airflow through the unsealed cavity. The lid assembly has a second sensor component in the unsealed cavity sensing an environmental characteristic exterior of the sensor connector.

20 Claims, 6 Drawing Sheets

(51) Int. Cl.
*G01J 1/02* (2006.01)
*H05B 47/105* (2020.01)

ENVIRONMENTAL SENSOR FOR A LIGHT SENSOR ASSEMBLY HAVING A LID ASSEMBLY COMPRISING AN AIRFLOW COMPONENT AND AN ENVIRONMENTAL SENSING COMPONENT

BACKGROUND OF THE INVENTION

The subject matter herein relates generally to environmental sensors for light sensor assemblies.

On outdoor lighting, notably street lights and parking lot lights, sensor components and the corresponding mating receptacles are typically used to turn the lights on and off based upon the ambient light from the sun. There is a need for light sensor assemblies to include capabilities in controls and sensing for environmental characteristics other than ambient light to enhance functionality of the light sensor assemblies. Sensors are needed to collect data about the environment around the light fixture. The sensors need to be protected from environmental factors, such as ingress of moisture, UV exposure, debris, insects, and the like.

A need remains for a light sensor assembly capable of protecting environmental sensors while still allowing proper operation of the environmental sensors.

BRIEF DESCRIPTION OF THE INVENTION

In one embodiment, a light sensor assembly is provided including a sensor connector configured to be coupled to a receptacle connector mounted to a light fixture. The sensor connector includes a housing having a top and a bottom defining a mating interface configured to be mated to the receptacle connector. The housing has a sealed cavity including a first sensor component in the sealed cavity sensing an environmental characteristic exterior of the sensor connector. The sensor connector includes power contacts held by the housing and extending from the bottom for electrical connection with receptacle power contacts of the receptacle connector. The sensor connector includes a lid assembly at the top of the housing. The lid assembly has a lid defining an unsealed cavity allowing airflow through the unsealed cavity. The lid assembly has a second sensor component in the unsealed cavity sensing an environmental characteristic exterior of the sensor connector.

In another embodiment, a light sensor assembly is provided including a sensor connector configured to be coupled to a receptacle connector mounted to a light fixture. The sensor connector includes a housing having a top and a bottom defining a mating interface configured to be mated to the receptacle connector. The sensor connector includes power contacts held by the housing and extending from the bottom for electrical connection with receptacle power contacts of the receptacle connector. The sensor connector includes a lid assembly at the top of the housing. The lid assembly has a lid defining an unsealed cavity. The lid assembly has a filter between the unsealed cavity and the exterior of the sensor connector allowing airflow therethrough between the exterior of the sensor connector and the unsealed cavity. The lid assembly has a sensor component in the unsealed cavity sensing an environmental characteristic exterior of the sensor connector.

In a further embodiment, a light sensor assembly is provided including a receptacle connector and a sensor connector coupled to a receptacle connector. The receptacle connector includes a receptacle housing having a top and a bottom configured to be mounted to a light fixture. The top defining a mating interface. The receptacle connector has receptacle power contacts held by the housing and exposed at the mating interface. The sensor connector includes a housing having a top and a bottom defining a mating interface configured to be mated to the receptacle connector. The sensor connector includes power contacts held by the housing and extending from the bottom for electrical connection with the receptacle power contacts of the receptacle connector. The sensor connector includes a lid assembly at the top of the housing. The lid assembly has a lid defining an unsealed cavity. The lid assembly has a filter between the unsealed cavity and the exterior of the sensor connector allowing airflow therethrough between the exterior of the sensor connector and the unsealed cavity. The lid assembly has a sensor component in the unsealed cavity sensing an environmental characteristic exterior of the sensor connector.

DETAILED DESCRIPTION OF THE INVENTION

Figure 1:
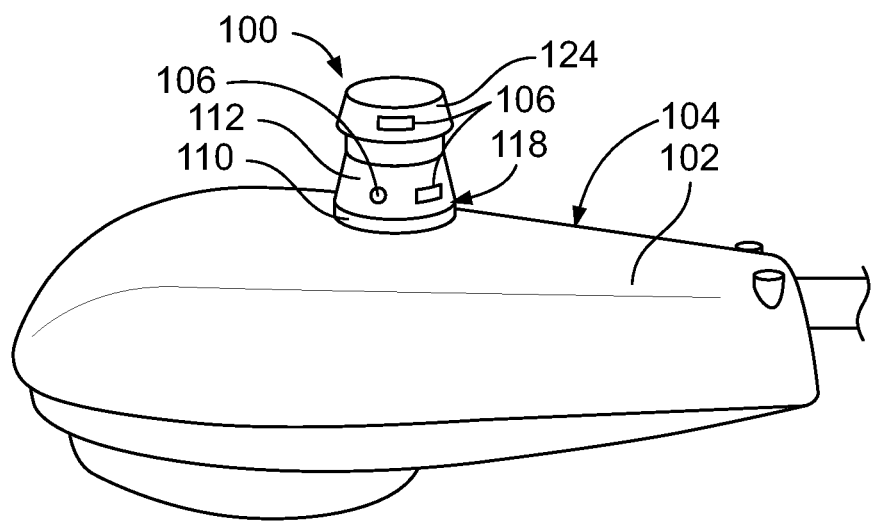
FIG. 1 illustrates a light sensor assembly formed in accordance with an exemplary embodiment.

FIG. 1 illustrates a light sensor assembly 100 formed in accordance with an exemplary embodiment. The light sensor assembly 100 is mounted to a housing 102, such as a housing of a light fixture 104, such as a roadway light, a parking lot light, a street light, and the like, or to another component, such as the pole or other structure supporting the light fixture 104, or to another component unassociated with the light fixture, such as a parking meter, a telephone pole or another structure. The light sensor assembly 100 holds one or more sensors or sensor components 106 that may be used for environmental monitoring or to control the light fixture 104, such as for turning the light fixture on or off depending upon light levels, for dimming control of the light fixture, or for controlling other functions. The sensor components 106 may be used for other functions other than controlling the light fixture 104, such as remote monitoring of the environmental surroundings of the housing 102, such as for weather monitoring, parking monitoring, for street flow activity monitoring, or other functions. The sensor components 106 may be a photocell or light sensor used to detect ambient light from the sun. Other types of sensor components 106 such as temperature sensors, humidity sensors, barometric pressure sensors, air quality sensors, object identification sensors, motion sensors, timing sensors or other types of environmental sensors may be included in the light sensor assembly 100.

The light sensor assembly 100 includes a receptacle connector 110 that forms the bottom of the assembly 100. The receptacle connector 110 may be directly mounted to the housing 102 of the light fixture 104 or may be mounted to another component on the housing 102. The light sensor assembly 100 includes a sensor connector 112 coupled to the receptacle connector 110. The sensor connector 112 houses or surrounds the sensor component 106, such as to provide environmental protection for the sensor component 106. In an exemplary embodiment, the receptacle connector 110 is a twist-lock photocontrol receptacle connector and the sensor connector 112 is a twist-lock photocontrol sensor connector, such as connectors being ANSI C136.x compliant. The connectors 110, 112 include contacts 114, 116 (shown in FIG. 3), respectively, at a mating interface 118. For example, the contacts 114, 116 may be twist-lock contacts. The contacts 114, 116 may be high voltage power contacts. Other types of contacts may be provided at the mating interface for a direct, physical electrical connection across the mating interface 118 between the connectors 110, 112. The connectors 110, 112 may be other types of connectors other than twist-lock connectors. The connectors 110, 112 may include other types of contacts 114, 116 other than twist-lock contacts or may not include any contacts but rather be contactless connectors.

In an exemplary embodiment, the receptacle connector 110 includes receptacle signal contacts 120 (shown in FIG. 3) and the sensor connector 112 includes signal contacts 122 (shown in FIG. 3) for data communication between the receptacle connector 110 and the sensor connector 112. Data may be transmitted from the sensor connector 112 to the receptacle connector 110, or vice versa, across the mating interface 118. For example, control signals may be transmitted from the sensor connector 112 to the receptacle connector 110 for controlling operation of the light fixture 104. The control signals may be based on sensor data gathered by the sensor component 106.

In an exemplary embodiment, the sensor connector 112 includes a lid assembly 124 at the top of the sensor connector 112. The lid assembly 124 covers the sensor connector 112. In an exemplary embodiment, the lid assembly 124 includes at least one of the sensor components 106. The lid assembly 124 exposes the sensor component(s) 106 associated therewith to air. For example, the lid assembly 124 includes at least one opening to allow airflow into the interior of the lid assembly 124. In an exemplary embodiment, the lid assembly 124 includes one or more filter elements in the airflow path to filter environmental contaminants, such as liquid moisture, debris, insects, and the like from interacting with the sensor component(s) 106.

Figure 2:
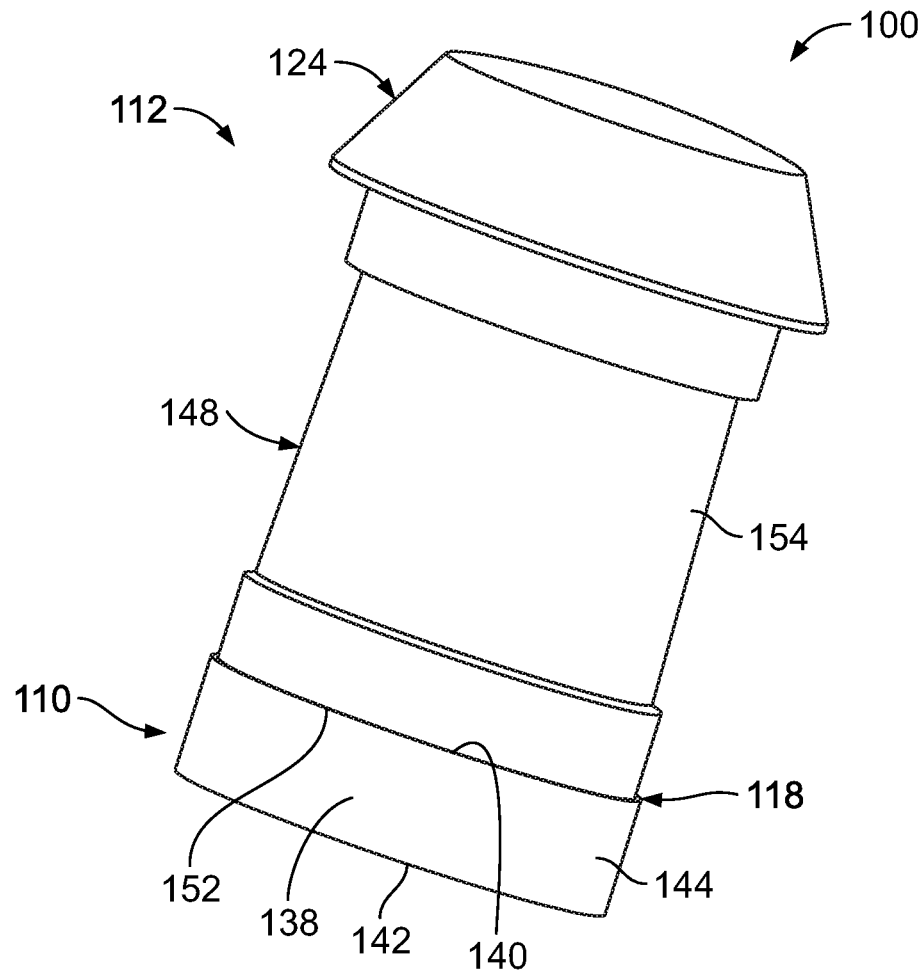
FIG. 2 is a perspective view of the light sensor assembly in accordance with an exemplary embodiment.
Figure 3:
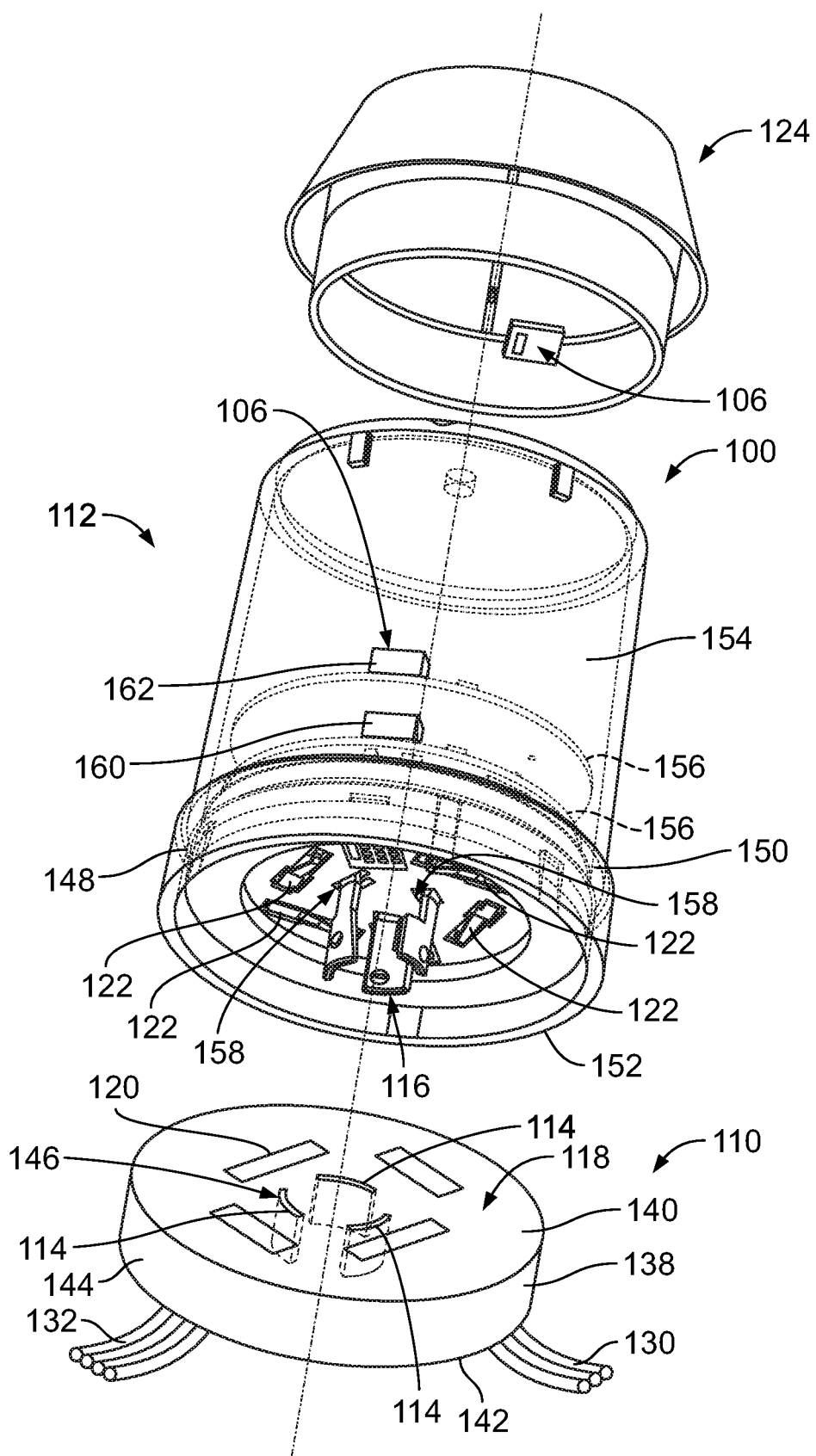
FIG. 3 is an exploded view of the light sensor assembly in accordance with an exemplary embodiment showing a sensor connector poised for mating with a receptacle connector.

FIG. 2 is a perspective view of the light sensor assembly 100 in accordance with an exemplary embodiment. FIG. 3 is an exploded view of the light sensor assembly 100 in accordance with an exemplary embodiment showing the sensor connector 112 poised for mating with the receptacle connector 110. The connectors 110, 112 hold the power contacts 114, 116 and the signal contacts 120, 122. Optionally, a seal (not shown) may be provided between the receptacle connector 110 and the sensor connector 112 to seal the light sensor assembly 100 at the mating interface 118 from environmental containments such as water, debris, and the like.

The light sensor assembly 100 may include power wires 130 extending from the receptacle connector 110. The power wires 130 are terminated to corresponding receptacle power contacts 114. The power wires 130 may be power in or power out wires bringing power to the light sensor assembly 100 from a power source or bringing power from the power contacts 114 to another component, such as the light or a driver board for the light of the light fixture 104. In various embodiments, the power wires 130 may include a line wire, a load wire, a neutral wire or other types of wires. In other various embodiments, the light sensor assembly 100 does not include the power wires 130 extending to/from the receptacle connector 110, but rather the power wires 130 may extend to other components in the light fixture 104.

The light sensor assembly 100 may additionally or alternatively include signal wires 132 extending from the receptacle connector 110. The signal wires 132 may be electrically connected to the receptacle signal contacts 120. The signal wires 132 may be electrically connected to other components, such as a control module or driver board of the light fixture 104. The signal wires 132 may transmit data to or from the receptacle connector 110 for data communication with the sensor connector 112. The signal contacts 120, 122 are directly mated together at the mating interface 118.

The receptacle connector 110 includes a housing 138 extending between a top 140 and a bottom 142 opposite the top 140. The bottom 142 is configured to be secured to the fixture housing 102 or another component. The receptacle connector 110 includes a side wall 144 between the top 140 and the bottom 142. The housing 138 holds the power contacts 114 and the signal contacts 120. Optionally, such components may be entirely contained within the housing 138 and protected from the environment by the housing 138. For example, the power contacts 114 may be held in contact channels 146 within the housing 138. Optionally, the contact channels 146 are curved slots or openings in the housing 138 extending between the top 140 and the bottom 142. In an exemplary embodiment, the receptacle connector 110 is cylindrical shaped, such as to allow easy rotation of the sensor connector 112 relative to the receptacle connector 110. However, the receptacle connector 110 may have other shapes and alternative embodiments.

In an exemplary embodiment, the receptacle connector 110 includes at least one securing feature used to secure the sensor connector 112 relative to the receptacle connector 110. For example, the receptacle connector 110 may include a clip or a flange to secure the sensor connector 112 to the receptacle connector 110. The securing feature may allow rotation of the sensor connector 112 relative to the receptacle connector 110 when engaged. Other fastening methods that secure sensor connector 112 to the receptacle connector 110 may be employed, which may allow rotation of the sensor connector 112 relative to the receptacle connector 110. In other various embodiments, the interaction between the power contacts 114, 116 is used to secure the sensor connector 112 to the receptacle connector 110.

The sensor connector 112 includes a housing 148 extending between a top 150 and a bottom 152 opposite the top 150. The lid assembly 124 is provided at the top 150. The bottom 152 may define the mating interface and is configured to be secured to the receptacle connector 110. In other embodiments, sides of the housing 148 or other securing features may be secured to the receptacle connector 110. In an exemplary embodiment, the housing 148 includes a dome 154 at the top 150 of the housing 148 and the lid assembly 124 may be at the top of the dome 154. The dome 154 may be integral with the base or other parts of the housing 148. Alternatively, the dome 154 may be a separate structure coupled to the base or other parts of the housing 148 and may be sealed to the base or other parts of the housing 148. The dome 154 may be rotatably coupled to the base of the housing 148, such as to allow positioning of the sensor component 106 relative to the light fixture 104 (e.g., to direct the photocell in a north direction or another direction to receive diffuse ambient light). The lid assembly 124 may be a separate component from the dome 154 or other parts of the housing 148. In other various embodiments, the lid assembly 124 may be integral with the dome 154 or other parts of the housing 148. In an exemplary embodiment, the receptacle connector 110 is cylindrical shaped, such as to allow easy rotation of the sensor connector 112 relative to the receptacle connector 110, such as during mating. However, the receptacle connector 110 may have other shapes and alternative embodiments.

The housing 148 holds the power contacts 116 and the signal contacts 122, such as in the base of the housing 148. For example, the power contacts 116 may be held in contact channels 158 within the housing 148. Optionally, the contact channels 158 are curved slots or openings in the housing 148. The housing 148 may hold the sensor(s) 106. In an exemplary embodiment, the housing 148 holds a circuit board 156 and various components are mounted to the circuit board 156. For example, the power contacts 116 and the signal contacts 122 may be mounted to the circuit board 156. The sensor components 106 may be mounted to the circuit board 156. A control module and/or communication device may be mounted to the circuit board 156. The power contacts 116 and the signal contacts 122 may extend from the bottom 152 for mating with the receptacle power contacts 114 and the receptacle signal contacts 120, respectively, of the receptacle connector 110 and may be arranged generally around a central axis, however the power contacts 114 and/or the signal contacts 122 may be at different locations in alternative embodiments. Optionally, the power contacts 116 may be curved and fit in the curved contact channels 146 in the receptacle connector 110 to mate with corresponding curved receptacle power contacts 114. In an exemplary embodiment, the sensor connector 112 may be twisted or rotated to lock the power contacts 116 in the receptacle connector 110, such as in electrical contact with the receptacle power contacts 114. For example, the power contacts 116 may be twist-lock contacts that are initially loaded into the contact channels 146 in a vertical direction and the sensor connector 112 is then rotated, such as approximately 35 degrees, to lock the power contacts 116 in the receptacle connector 110. Other types of mating arrangements between the power contacts 116 and the receptacle connector 110 are possible in alternative embodiments.

In an exemplary embodiment, the sensor connector 112 includes different types of environmental sensor components 106 for sensing different events. For example, the sensor connector 112 includes a photocell 160. The photocell 160 is used for sensing ambient light and is used to control operation of the light fixture 104, such as for turning the light fixture 104 on or off depending upon light levels or for dimming control of the light fixture 104. Optionally, the photocell 160 may be mounted to the circuit board 156. Alternatively, the photocell 160 may be mounted in the dome 154 and aim-able by rotating the dome 154 relative to the housing 148. In other various embodiments, the photocell 160 may be mounted to the dome 154 and connected to the circuit board 156 by one or more wires or contacts. The photocell 160 may be part of the lid assembly 124 in various embodiments. The signal contacts 120 and the photocell 160 may be electrically connected via the circuit board 156. The circuit board 156 may include additional componentry for signal conditioning. For example, the circuit board 156 may have control circuitry for controlling operation of the light fixture 104, such as including a daylight or nighttime control circuit, a timer circuit, a dimming circuit, and the like. Data from the photocell 160 may be transmitted through the signal contacts 120, 122 across the mating interface 118.

In an exemplary embodiment, the sensor connector 112 includes one or more environmental sensors 162 for sensing an environmental characteristic other than ambient light exterior of the sensor connector 112 in the environment exterior of the sensor connector 112. The environmental sensor 162 may be provided in the dome 154. The sensor 162 may be mounted to the circuit board 156. In an exemplary embodiment, the sensor 162 is electrically connected to the sensor contacts 122 via the circuit board 156. The environmental sensor 162 may be provided in the lid assembly 124. The environmental sensor 162 in the lid assembly 124 may be connected to the circuit board 156 in the housing 148 by wires, contacts and the like passing through the top of the dome 154 or may communicate wirelessly. The environmental sensor 162 may be a motion sensor or an object sensor configured to sense movement, sound or presence of an object, such as a person or vehicle in a particular area. The sensor 162 may be used for parking monitoring, for street flow activity monitoring, for pedestrian monitoring, or other functions. The environmental sensor 162 may be a weather sensor, such as a temperature sensor, a humidity sensor, a barometric pressure sensor, an air quality sensor, and the like. In an exemplary embodiment, the dome 154 is sealed from the external environment and environmental sensors 162 in the dome are sealed from the external environment. In an exemplary embodiment, the lid assembly 124 is unsealed from the external environment and the environmental sensors 162 in the lid assembly 124 are exposed to air for sensing characteristics of the air. The lid assembly 124 may protect the environmental sensors 162 associated therewith from other environmental contaminants, such as liquid moisture, debris and insects.

Figure 4:
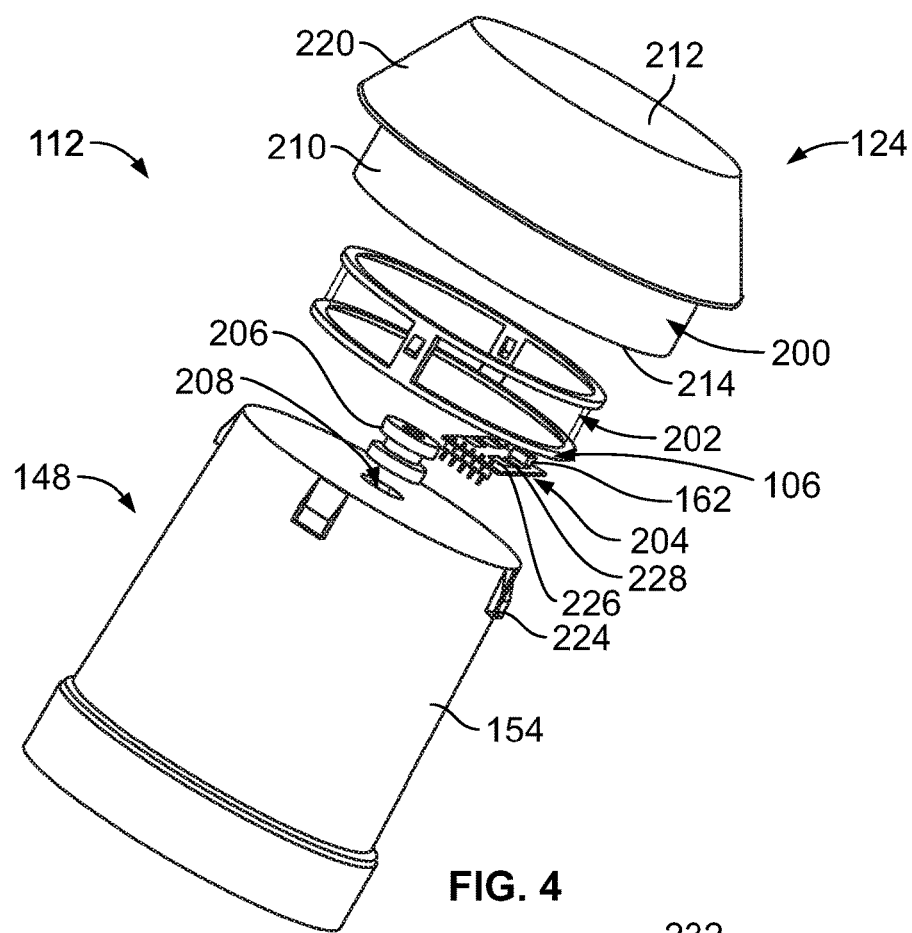
FIG. 4 is an exploded view of the sensor connector showing a lid assembly in accordance with an exemplary embodiment.
Figure 5:
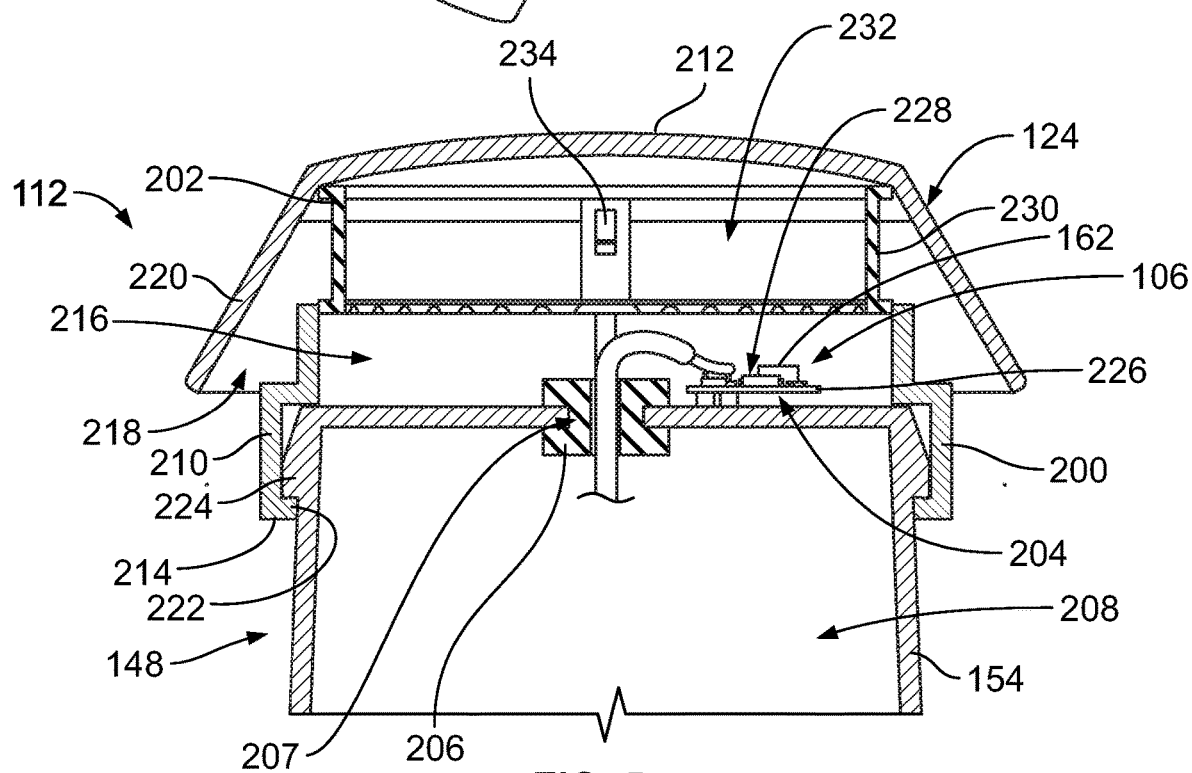
FIG. 5 is a cross-sectional view of a portion of the sensor connector showing the lid assembly in accordance with an exemplary embodiment.

FIG. 4 is an exploded view of the sensor connector 112 showing the lid assembly 124 in accordance with an exemplary embodiment coupled to the dome 154. FIG. 5 is a cross-sectional view of a portion of the sensor connector 112 showing the lid assembly 124 in accordance with an exemplary embodiment coupled to the dome 154. The lid assembly 124 includes a lid 200 configured to be coupled to the dome 154, a filter 202 received in the lid 200, and a sensor assembly 204 received in the lid 200. In an exemplary embodiment, a seal 206 is provided at the top of the dome 154 for sealing a cavity 208 of the dome 154. The seal 206 may be received in an opening 207 at the top of the dome 154. The seal 206 may be a wire seal configured to receive a wire to allow the wire to pass through the opening 207 into the sealed cavity 208 of the dome 154, such as from the sensor assembly 204. Other types of seals may be provided in alternative embodiments, such as a perimeter seal around the perimeter of the dome 154 at the interface with the lid 200.

The lid 200 includes a body 210 extending between a top 212 and a bottom 214. In the illustrated embodiment, the lid 200 is a separate component from the dome 154 of the housing 148 and is coupled to the dome 154. However, in alternative embodiments, the lid 200 may be integral with the dome 154. For example, the body 210 may be a monolithic structure with the body of the dome 154. The lid 200 includes a cavity 216 that receives the filter 202 and the sensor assembly 204. The body 210 includes at least one opening 218 to the cavity 216. The opening 218 is unsealed to allow airflow from exterior of the lid assembly 124 into the unsealed cavity 216, such as to allow air and/or water vapor into the unsealed cavity 216 for monitoring characteristics of the airflow. The lid 200 includes a hood 220 at the top 212 that covers the unsealed cavity 216. The hood 220 stops rain and other debris from entering the cavity 216. The hood 220 may block UV light from entering the cavity 216. In an exemplary embodiment, the lid 200 includes a securing feature 222 at or near the bottom 214 for securing the lid 200 to the dome 154. For example, the securing feature 222 may engage a complementary securing feature 224 of the dome 154 to secure the lid 200 to the dome 154. The securing feature 222 may be a latch, a clip, or another type of securing feature, such as a fastener. In other various embodiments, the lid 200 may be threadably coupled to the dome 154.

The sensor assembly 204 is configured to be located in the cavity 216 of the lid 200. The sensor assembly 204 may be mounted to the top of the dome 154. Alternatively, the sensor assembly 204 may be mounted to another part of the lid assembly 124, such as to the lid 200. In the illustrated embodiment, the sensor assembly 204 includes a circuit board 226 having one or more electrical components 228 on the circuit board 226. For example, the electrical components 228 may include a processor, a memory, a communication device, resistors, capacitors, inductors or other types of electrical components 228. The sensor assembly 204 includes one or more of the sensor components 106, which may be mounted to the circuit board 226. The sensor component 106 senses environmental characteristics of the surrounding environment of the sensor connector 112. For example, the sensor component 106 may be one of the environmental sensors 162 defining a weather sensor configured to sense a characteristic of the air around the sensor connector 112. For example, the environmental sensor 162 may be a temperature sensor, a humidity sensor, a barometric pressure sensor, an air quality sensor, and the like. The air is allowed to flow through the opening 218 in the lid 200 into the cavity 216. Other types of environmental sensors 162 and/or the photocell 160 may be part of the sensor assembly 204.

The filter 202 is located in the cavity 216 of the lid 200, such as at or near the opening 218 to filter the air flowing into the cavity 216. The filter 202 is in the airflow path to filter environmental contaminants, such as liquid moisture, debris, insects, and the like from interacting with the sensor component(s) 106. In the illustrated embodiment, the filter 202 includes a filter frame 230 and a filter element 232 supported by the filter frame 230. The filter frame 230 is a rigid structure, such as a plastic or metal frame that supports the filter element 232. The filter frame 230 includes one or more filter securing features 234 for securing the filter 202 to the lid 200. The filter securing features 234 may be latches, clips, or other types of fasteners. The filter element 232 may be a screen, a fabric, a foam gasket or other type of filter element that allows airflow therethrough but that restricts other contaminants from entering the cavity 216. Optionally, the filter element 232 may be a fiberglass screen having small openings therethrough for allowing airflow. In the illustrated embodiment, the filter 202 extends circumferentially around the perimeter of the lid 200. In alternative embodiments, discrete filters may be provided in separately coupled to the lid 200, such as at corresponding openings 218.

Figure 6:
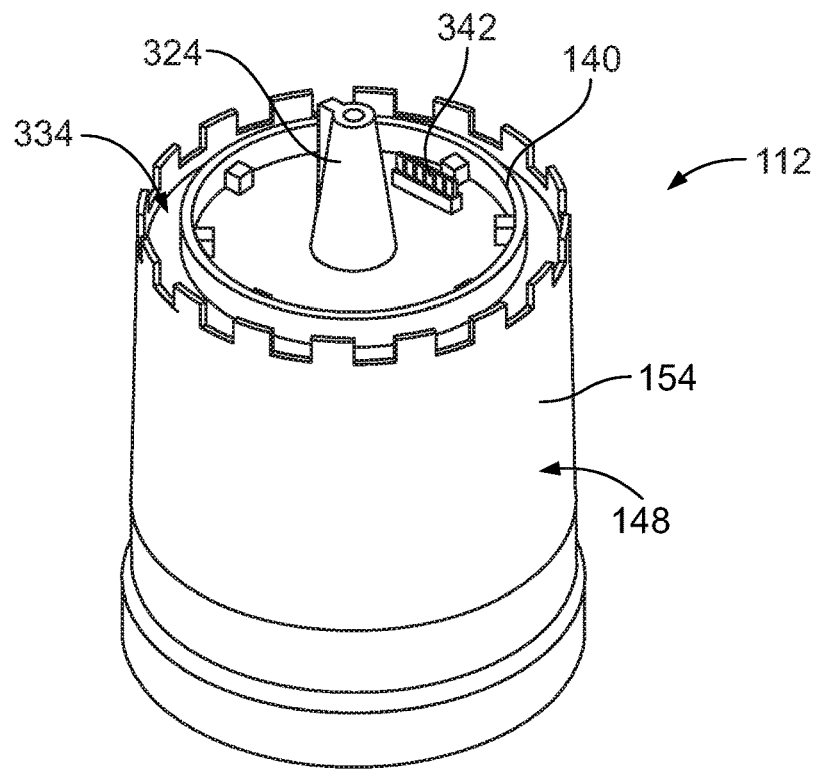
FIG. 6 is a top perspective view of a portion of the sensor connector in accordance with an exemplary embodiment.
Figure 7:
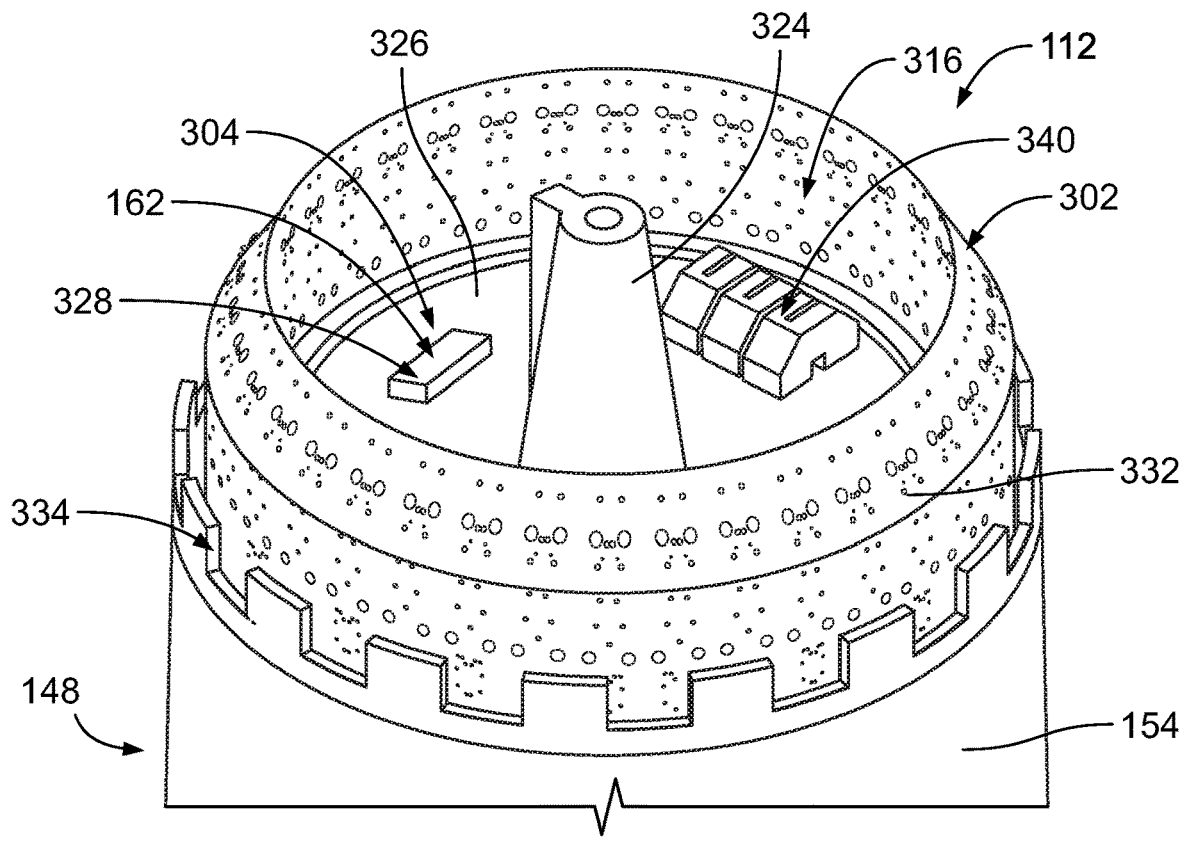
FIG. 7 is a top perspective view of a portion of the sensor connector showing the lid assembly in accordance with an exemplary embodiment.
Figure 8:
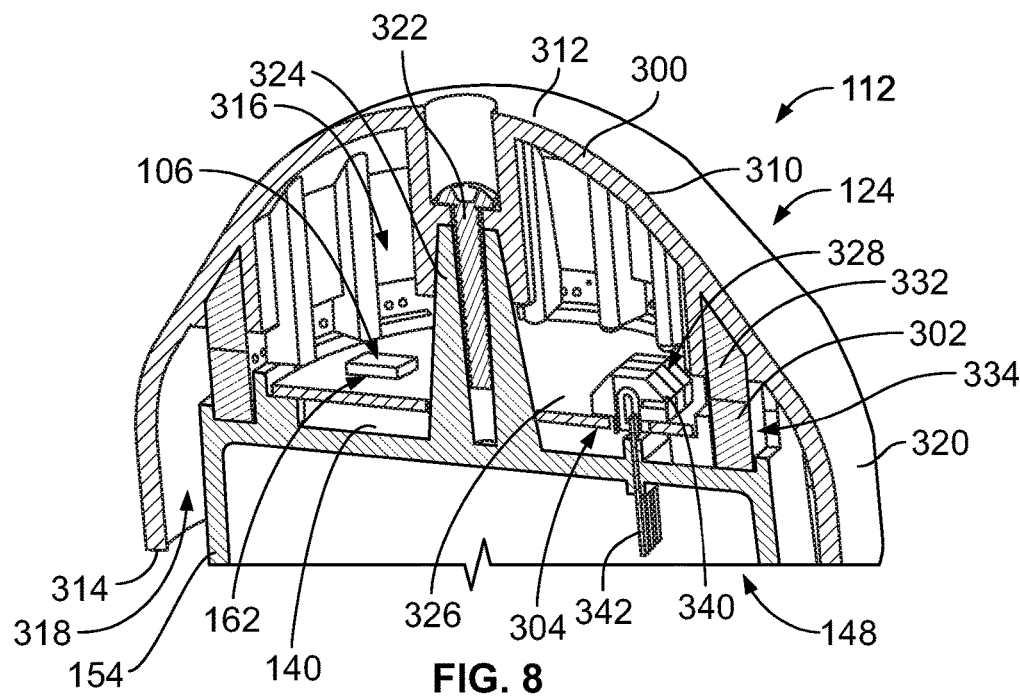
FIG. 8 is a sectional view of a portion of the sensor connector showing the lid assembly in accordance with an exemplary embodiment.

FIG. 6 is a top perspective view of a portion of the sensor connector 112 showing the dome 154 in accordance with an exemplary embodiment. FIG. 7 is a top perspective view of a portion of the sensor connector 112 showing the lid assembly 124 in accordance with an exemplary embodiment coupled to the dome 154. FIG. 8 is a sectional view of a portion of the sensor connector 112 showing the lid assembly 124 in accordance with an exemplary embodiment coupled to the dome 154. The lid assembly 124 includes a lid 300 configured to be coupled to the dome 154, a filter 302 received in the lid 300, and a sensor assembly 304 received in the lid 300. The lid 300 is similar to the lid 200 (shown in FIG. 4); however, the lid 300 may be sized and shaped differently than the lid 200. The filter 302 is similar to the filter 202 (shown in FIG. 4); however, the filter 302 may be sized and shaped differently than the filter 202 and/or formed from a different material. The sensor assembly 304 is similar to the sensor assembly 204 (shown in FIG. 4); however, the sensor assembly 304 may be sized and shaped differently than the sensor assembly 304 and/or include different types of electrical components.

The lid 300 includes a body 310 extending between a top 312 and a bottom 314. The lid 300 includes a cavity 316 that receives the filter 302 and the sensor assembly 304. The body 310 includes at least one opening 318 to the cavity 316. The opening 318 is unsealed to allow airflow from exterior of the lid assembly 124 into the cavity 316. The lid 300 includes a hood 320 at the top 312 that covers the unsealed cavity 316. The openings 318 are provided at the bottom 314. In an exemplary embodiment, the lid 300 includes a securing feature 322 for securing the lid 300 to the dome 154. For example, in the illustrated embodiment, the securing feature 322 is a fastener coupled to a post at a center of the dome 154 defining a securing feature 324 of the dome 154.

The sensor assembly 304 is configured to be located in the cavity 316 of the lid 300. The sensor assembly 304 is captured between locating features of the dome 154 and the lid 300. In the illustrated embodiment, the sensor assembly 304 includes a circuit board 326 having one or more electrical components 328 on the circuit board 326. For example, the electrical components 328 may include a connector 340 coupled to electrical contacts 342 of the sensor connector 112. The electrical contacts 342 are coupled to the housing 148 at the top 140. The electrical contacts 342 are exposed in the sealed cavity of the dome 154 and the unsealed cavity 316 of the lid 300. The electrical contacts 342 may be pin contacts. The electrical contacts 342 may be insert molded into the housing 148, such as into the dome 154. The sensor assembly 304 includes one or more of the sensor components 106, which may be mounted to the circuit board 326. The sensor component 106 senses environmental characteristics of the surrounding environment of the sensor connector 112. For example, the sensor component 106 may be one of the environmental sensors 162 defining a weather sensor configured to sense a characteristic of the air around the sensor connector 112. For example, the environmental sensor 162 may be a temperature sensor, a humidity sensor, a barometric pressure sensor, an air quality sensor, and the like. The air is allowed to flow through the opening 318 in the lid 300 into the cavity 316.

Other types of environmental sensors 162 and/or the photocell 160 may be part of the sensor assembly 304.

The filter 302 is located in the cavity 316 of the lid 300, such as at or near the opening 318 to filter the air flowing into the cavity 316. The filter 302 is in the airflow path to filter environmental contaminants, such as liquid moisture, debris, insects, and the like from interacting with the sensor component(s) 106. In the illustrated embodiment, the filter 302 includes a filter element 332, and may include a filter frame (not shown) supporting the filter element. In the illustrated embodiment, the filter element 332 is donut-shaped extending around the perimeter of the dome 154. The dome 154 includes one or more filter securing features 334 for securing the filter element 332 to the dome 154. In the illustrated embodiment, the filter securing features 334 include tabs or flanges defining a track receiving the filter element 332. Other types of filter securing features 334 may be provided in alternative embodiments. In alternative embodiments, the filter element 332 may be coupled to the lid 200 rather than the dome 154. The filter element 332 may be a foam gasket, such as an open cell foam gasket; however, or other type of filter elements may be used in alternative embodiments.

Figure 9:
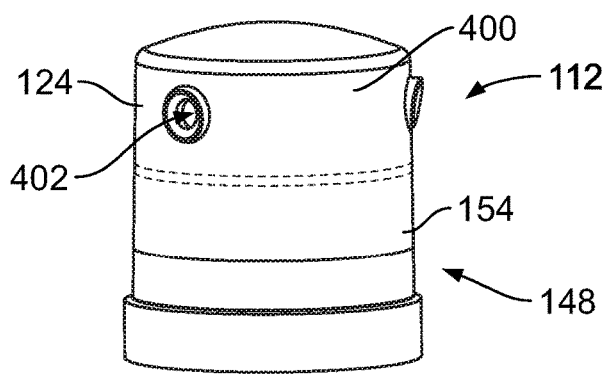
FIG. 9 is a perspective view of the sensor connector in accordance with an exemplary embodiment.

FIG. 9 is a perspective view of the sensor connector 112 in accordance with an exemplary embodiment. In the illustrated embodiment, the lid assembly 124 is integral with the housing 148. For example, a lid 400 is integral with the dome 154. A wall or other structure may be provided to separate a sealed cavity from an unsealed cavity within the sensor connector 112. The lid assembly 124 includes a filter 402 to allow airflow into the lid assembly 124. In the illustrated embodiment, the filter 402 is a vent configured to allow airflow and block other contaminants from entering the cavity of the lid assembly 124.

Figure 10:
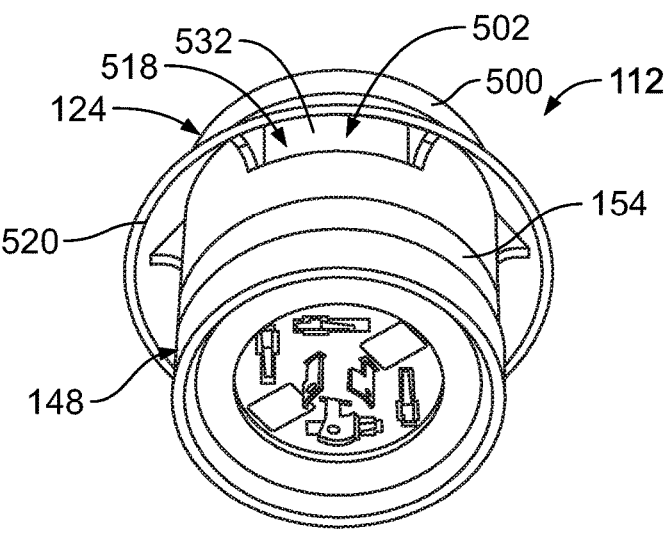
FIG. 10 is a bottom perspective view of the sensor connector in accordance with an exemplary embodiment.
Figure 11:
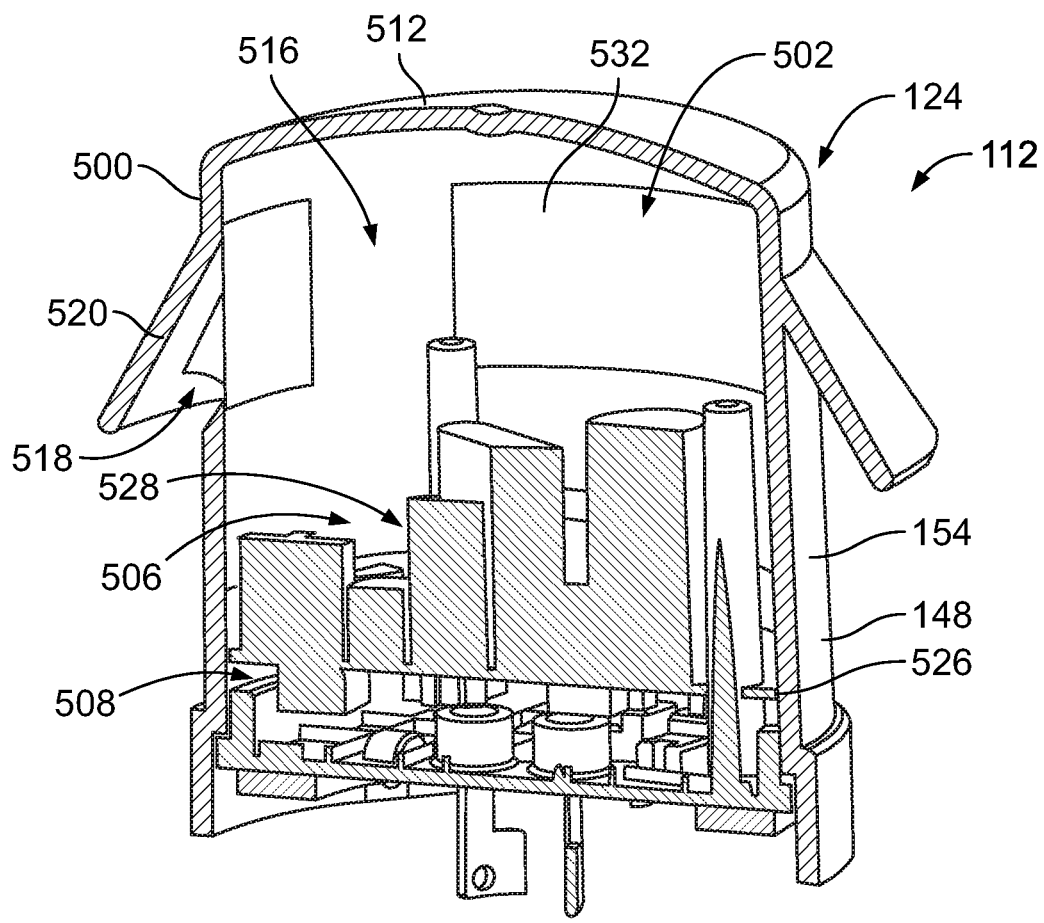
FIG. 11 is a sectional view of a portion of the sensor connector showing the lid assembly in accordance with an exemplary embodiment.

FIG. 10 is a bottom perspective view of the sensor connector 112 in accordance with an exemplary embodiment. FIG. 11 is a sectional view of a portion of the sensor connector 112 showing the lid assembly 124 in accordance with an exemplary embodiment. In the illustrated embodiment, the lid assembly 124 is integral with the housing 148. For example, a lid 500 is integral with the dome 154. However, in alternative embodiments, the lid assembly 124 may be a separate structure coupled to the housing 148. The lid assembly 124 includes a filter 502 received in the lid 500, and a sensor assembly 504 received in the lid 500. In an exemplary embodiment, the lid assembly 124 includes a separating wall 506 that separates a sealed cavity 508 from an unsealed cavity 516. In alternative embodiments, sensor connector 112 is provided without the separating wall 506 such that only an unsealed cavity is provided. The lid 500 is similar to the lid 200 (shown in FIG. 4); however, the lid 500 may be sized and shaped differently than the lid 200. The filter 502 is similar to the filter 202 (shown in FIG. 4); however, the filter 502 may be sized and shaped differently than the filter 202 and/or formed from a different material. The sensor assembly 504 is similar to the sensor assembly 204 (shown in FIG. 4); however, the sensor assembly 504 may be sized and shaped differently than the sensor assembly 504 and/or include different types of electrical components.

The lid 500 includes at least one opening 518 to the cavity 516. The opening 518 is unsealed to allow airflow from exterior of the lid assembly 124 into the cavity 516. The lid 500 includes a hood 520 at the top 512 that covers the unsealed cavity 516. The sensor assembly 504 is configured to be located in the cavity 516 of the lid 500. The sensor assembly 504 includes a circuit board 526 having one or more electrical components 528 on the circuit board 526. The sensor assembly 504 includes one or more of the sensor components 106.

The filter 502 is located at or near the openings 518 to filter the air flowing into the cavity 516. The filter 502 is in the airflow path to filter environmental contaminants, such as liquid moisture, debris, insects, and the like from interacting with the sensor component(s) 106. In the illustrated embodiment, the filter 502 includes a filter element 532. In the illustrated embodiment, the filter element 532 is a breathable vent, such as a vent designed to repel liquid water, debris and other contaminants while allowing water vapor and air to flow therethrough. The filter element 532 may include a stack of woven layers. The pitch and/or weave direction of the woven fibers of the woven layers create air channels that allow airflow through the filter element 532 while restricting other contaminants from entering the cavity 516.

Figure 12:
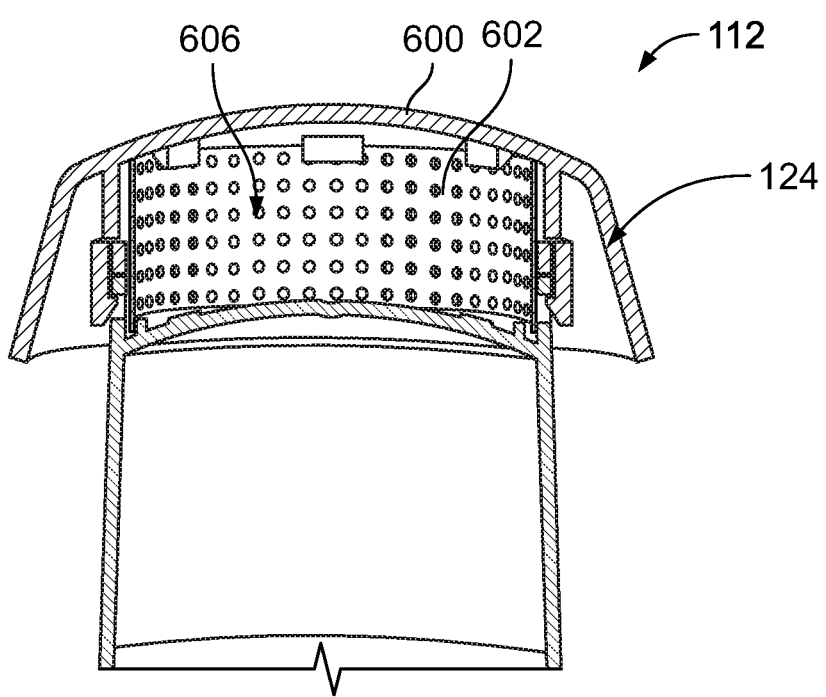
FIG. 12 is a perspective view of the sensor connector in accordance with an exemplary embodiment.

FIG. 12 is a perspective view of the sensor connector 112 in accordance with an exemplary embodiment. The lid assembly 124 includes a lid 600 and a filter 602. In the illustrated embodiment, the filter 602 is a screen having openings 606. The openings 606 allow airflow through the screen and prevent other contaminants from entering the cavity of the lid assembly 124.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A light sensor assembly comprising:
a sensor connector configured to be coupled to a receptacle connector mounted to a light fixture, the sensor connector comprising:
a housing having a top and a bottom, the bottom defining a mating interface configured to be mated to the receptacle connector, the housing having a sealed cavity including a first sensor component in the sealed cavity, the first sensor component sensing an environmental characteristic exterior of the sensor connector;
power contacts held by the housing and extending from the bottom for electrical connection with receptacle power contacts of the receptacle connector; and a lid assembly at the top of the housing, the lid assembly having a lid defining an unsealed cavity allowing airflow through the unsealed cavity, the lid assembly having a second sensor component in the unsealed cavity sensing an environmental characteristic exterior of the sensor connector.

2. The light sensor assembly of claim 1, wherein the lid includes at least one opening allowing the airflow through the unsealed cavity.

3. The light sensor assembly of claim 1, wherein the lid assembly includes a filter between the unsealed cavity and the exterior of the socket connector, the filter allowing the airflow through the unsealed cavity.

4. The light sensor assembly of claim 3, wherein the filter is a liquid moisture barrier.

5. The light sensor assembly of claim 3, wherein the filter comprises a filter frame and a filter element supported by the filter frame.

6. The light sensor assembly of claim 3, wherein the lid includes an opening allowing the airflow through the unsealed cavity, the filter covering the opening.

7. The light sensor assembly of claim 3, wherein the filter comprises an open cell foam filter element.

8. The light sensor assembly of claim 3, wherein the filter comprises a screen.

9. The light sensor assembly of claim 3, wherein the filter comprises a breathable vent.

10. The light sensor assembly of claim 1, wherein the housing includes an opening in the top having a seal in the opening, the lid assembly having a wire extending from the $2^{nd}$ sensor component through the sealed opening into the sealed cavity.

11. The light sensor assembly of claim 1, wherein at least one of the $1^{st}$ sensor component and the $2^{nd}$ sensor component is electrically coupled to the power contacts.

12. The light sensor assembly of claim 1, wherein the lid assembly comprises a circuit board in the unsealed cavity, the $2^{nd}$ sensor component being coupled to the circuit board.

13. The light sensor assembly of claim 1, wherein the socket connector comprises electrical contacts coupled to the housing at the top, the electrical contacts being exposed in the sealed cavity and in the unsealed cavity.

14. The light sensor assembly of claim 1, wherein the housing includes a securing feature, the lid including a securing feature coupled to the securing feature of the housing to secure the lid assembly to the housing.

15. The light sensor assembly of claim 1, further comprising signal contacts held by the housing and extending from the bottom for electrical connection with receptacle signal contacts of the receptacle connector, the signal contacts being electrically coupled to at least one of the first sensor component and the second sensor component.

16. A light sensor assembly comprising:
a sensor connector configured to be coupled to a receptacle connector mounted to a light fixture, the sensor connector comprising:
a housing having a top and a bottom, the bottom defining a mating interface configured to be mated to the receptacle connector;
power contacts held by the housing and extending from the bottom for electrical connection with receptacle power contacts of the receptacle connector; and
a lid assembly at the top of the housing, the lid assembly having a lid defining an unsealed cavity, the lid assembly having a filter between the unsealed cavity and the exterior of the sensor connector, the filter allowing airflow therethrough between the exterior of the sensor connector and the unsealed cavity, the lid assembly having a sensor component in the unsealed cavity sensing an environmental characteristic exterior of the sensor connector.

17. The light sensor assembly of claim 16, wherein the filter comprises a filter frame and a filter element supported by the filter frame.

18. The light sensor assembly of claim 16, wherein the lid includes an opening allowing the airflow through the unsealed cavity, the filter covering the opening.

19. A light sensor assembly comprising:
a receptacle connector having a receptacle housing having a top and a bottom, the bottom configured to be mounted to a light fixture, the top defining a mating interface, the receptacle connector having receptacle power contacts held by the housing and exposed at the mating interface; and
a sensor connector coupled to a receptacle connector, the sensor connector comprising a housing having a top and a bottom, the bottom mated to the receptacle connector at the mating interface, the sensor connector comprising power contacts held by the housing and extending from the bottom for electrical connection with the receptacle power contacts of the receptacle connector, the sensor connector comprising a lid assembly coupled to the top of the housing, the lid assembly having a lid defining an unsealed cavity, the lid assembly having a filter between the unsealed cavity and the exterior of the sensor connector, the filter allowing airflow therethrough between the exterior of the sensor connector and the unsealed cavity, the lid assembly having a sensor component in the unsealed cavity sensing an environmental characteristic exterior of the sensor connector.

20. The light sensor assembly of claim 19, wherein the sensor connector is rotatably coupled to the receptacle connector.

* * * * *